United States Patent Office 3,658,856
Patented Apr. 25, 1972

3,658,856
PROCESS FOR PREPARING USEFUL 17α-HYDROXY-20-KETO-21-ACYLOXY PREGNANES
Pierre Crabbé, Mexico City, Mexico, and Michel S. Biollaz, Basel, Switzerland, assignors to Syntex Corporation, Panama, Panama
No Drawing. Filed Sept. 2, 1969, Ser. No. 863,743
Int. Cl. C07c 169/32
U.S. Cl. 260—397.45      12 Claims

ABSTRACT OF THE DISCLOSURE

New process for preparing 17α-hydroxy-20-keto-21-acyloxy pregnanes and derivatives thereof, which compounds are useful as anti-inflammatory agents. The processes utilize the steps of converting a 17-spiro-(gem-dihalocyclopropyl) steroid to the corresponding 21-halo-21-acyloxy-Δ$^{17(20)}$-ene steroid with a soluble silver salt in a carboxylic acid and oxidizing the 20-halo-21-acyloxy-Δ$^{17(20)}$-ene steroid to form the corresponding product pregnanes.

---

The present invention relates to a new process for the preparation of therapeutically valuable steroid derivatives and to novel intermediate compounds useful in this process. In particular, the present invention is directed ot a process for the preparation of 17α-hydroxy-20-keto-21-acyloxy pregnane steroids.

Steroid compounds which bear the 17α-hydroxy-20-keto-21-acyloxy system demonstrate important and potent biological activities. They can be readily hydrolyzed to the corresponding 17α,21-dihydroxy-20-keto steroids which are also important for their exhibited biological activities.

It has been demonstrated that steroids having oxygen functions at positions C–17, C–20, and C–21 possess anti-inflammatory activity which make them useful as agents for the treatment of conditions responsive thereto such as arthritis, allergic dermatitis, contact dermatitis, and the like. Examples of compounds in this series of steroids which possess and have been used in accordance with such activity are betamethasone cortisone, dexamethasone, hydrocortisone, methylprednisolone, paramethasone, prednisolone, predisone, and triamcinolone. Many other steroids having the requisite 17α,21-dihydroxy-20-keto system which exhibit corticoidal activity are known and have been described repeatedly, for example, in Steroid Drugs by Norman Applezweig; vol. 1, McGraw-Hill Book Company, Inc., 1962 and vol. 2, Holden Day, Inc., 1964.

The compounds of the present invention demonstrate anti-inflammatory properties similar to these known 17α, 21-dihydroxy-20-ketone compounds as they are conventional monoester derivatives thereof. If desired, they can be hydrolyzed at the C–21 position following conventional techniques involving use of potassium carbonate or potassium hydroxide in methanol.

Typical 17α-hydroxy-20-keto-21-acyloxy compounds which are prepared in accordance herewith are those of the following partial formula:

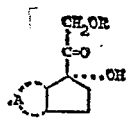

wherein A is the remainder of the steroid molecule comprising the A, B and C rings and R is carboxylic acyl of from one to eight carbon atoms, inclusive.

The present invention is directed to a new process useful for the preparation of 17α-hydroxy-20-keto-21-acyloxy steroids of the pregnane series.

By employing, for the sake of convenience and simplicity, partial formulas of Ring D of the steroid molecule, the method by which these compounds can be prepared in accordance herewith can be graphically depicted according to the following reaction sequence:

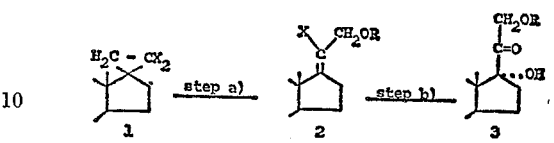

wherein R and X are as defined above; R, carboxylic acyl of from 1 to 8 carbon atoms, inclusive, and X, bromo or chloro.

The present invention in a first, principal aspect resides in a process comprising the step of treating a 17-spiro-gem-dihalocyclopropyl)androstane (1) with a soluble silver salt in a carboxylic acid to yield the corresponding 20-halo-21-acyloxypregn-17(20)-ene (2).

The present invention in a second principal aspect resides in a process comprising the steps of treating a 17-spiro(gem-dihalocyclopropyl)androstane with a soluble silver salt in a carboxylic acid to yield the corresponding 20-halo-21-acyloxypregn-17(20)-ene and oxidizing the resulting 20-halo-21-acyloxypregn-17(20)-ene (2).

In the foregoing process, the second (oxidation) step furnishes the 17α-hydroxy-20-keto-21-acyloxy compounds (3). Thus, the usefulness of the first aspect resides in the process for preparing 20-halo-21-acyloxypregn-17(20)-ene steroids which are useful as intermediates for the preparation of the 17α-hydroxy-20-keto-21-acyloxy products hereof. These products are, in turn, useful per se as anti-inflammatory agents or are convertable to known, useful anti-inflammatory agents upon simple base hydrolysis.

In accordance with the embodiments of the first aspect process of the present invention, a starting compound possessing, in part, the skeleton formula outlined by Formula 1 above is reacted together with a soluble silver salt in a carboxylic acid. Soluble silver salts are those which are soluble in the employed carboxylic acid. The extent of solubility can vary up from about 1 gram of the silver salt per liter of carboxylic acid, preferably about 5 grams or more per liter.

Representative soluble silver salts are silver acetate, silver benzoate, silver bromate, silver chlorate, silver fluoride, silver hydrogen periodate, silver lactate, silver levulinate, silver permanganate, silver nitrate, silver nitrite, silver propionate, silver sulfate, silver tartrate, silver citrate, silver phosphate, silver picrate and, in the preferred embodiments, silver acetate, silver chlorate, silver perchlorate, silver fluoride and silver nitrate.

Representative carboxylic acid solvents that are used in the above process include those containing from one to eight carbon atoms, inclusive, such as formic, acetic, propionic, butyric, valeric, caproic, enanthic and caprylic-acid including the branched chain homologs thereof such as trimethylacetic and isobutyric acid. The preferred carboxylic acid is acetic acid.

This reaction is conducted at a temperature ranging from about 15° C. to the boiling point of the reaction mixture and under reflux for a period of time sufficient to complete the reaction ranging from about one hour to about twenty-four hours. The reaction is further performed under an inert gas atmosphere such as can be provided by nitrogen or argon gas. The reaction may be optionally conducted with an inert, organic ether solvent in combination with the carboxylic acid employed. Representative organic ether solvents are diethyl ether, diisopropyl ether, dioxane, tetrahydrofuran and the like and mixtures thereof.

With continued reference to the above reaction scheme, the method of step b) outlined above is performed by oxidizing together the 20-halo-21-acyloxypregn-17(20)-ene compound (2) with an oxidizing agent. Suitable oxidizing agents include osmium tetroxide, either alone or in combination with hydrogen peroxide; a percarboxylic acid such as peracetic, perbenzoic, m-chloroperbenzoic, monoperphthalic, persuccinic, pertrifluoroacetic, and performic; phenyliodoso acetate; and morpholine. These oxidizing agents are known per se and their manners of use have been described in the literature. See Fieser and Fieser, Steroids, Reinhold Publishing Co., New York, 1959, page 659 and Hogg et al., Journal of the American Chemical Society 77, 4438 (1955) and Miescher, Helv. Chem. Acta. 33, 1840 (1950) and the references cited therein, all hereby incorporated by reference.

The oxidation reaction is conveniently performed in the presence of inert, liquid organic reaction medium and at temperatures ranging from about 0° C. up to the boiling point of the reaction mixture. Suitable media include those usually thus employed such as the tertiary alkanols, for example, tertiary butanol, tertiary amyl alcohol and the like and mixtures thereof; the hydrocarbon solvents such as hexane, heptane, isooctane, decane, and the like and mixtures thereof; the cycloalkyl hydrocarbon solvents such as cyclopentane, cyclohexane and the like and mixtures thereof; the monocyclic aryl hydrocarbon solvents such as benzene, toluene, cumene, xylene, and the like and mixtures thereof; and the chlorinated methanes, such as methylene chloride, chloroform, and the like and mixtures thereof. The choice of liquid reaction media is made taking into consideration any potential interference or competition which may develop with the particular oxidizing agent employed, in accordance with the level of ordinary skill of the art.

In carrying out the above described reaction steps, the respective starting compound and the respective reactant(s) are contacted and maintained together in any convenient order or fashion, in accordance with the preferences described. The reaction mixtures are then maintained within the given temperature range for a period of time sufficient to complete the reaction. Upon the completion of the respective reaction, the reaction mixture is processed by conventional procedures such as dilution, filtraton, extraction, decantation, distillation, evaporation, chromatography, and so forth to recover and isolate the desired product.

The given reactions consume the respective reactants in the ratio of one mole of the starting compound per mole of soluble silver salt and carboxylic acid and per two moles of oxidizing agent. However, the amounts of the reactants to be employed are not critical, some of the desired product being obtained when employing any proportions thereof. In the preferred embodiments hereof, the appropriate soluble silver salt and carboxylic acid reactants are employed in amounts ranging from about one mole to about twenty moles, preferably at least two to about six moles, per mole of the respective starting steroid compound, and the oxidizing agent in the amount ranging from about one mole to about ten moles, preferably from one to six moles, per mole of the respective starting compound.

The process of the present invention is particularly useful for the preparation of basic pregnane compounds which exhibit anti-inflammatory activity, but more importantly, which also are very suitable as nuclei which can be further elaborated, in accordance with known and standard methods, to prepare compounds exhibiting anti-inflammatory activity considered valuably potent in the steroid art. For example, the process hereof is notably suited for the preparation of such basic compounds as the 21-acetates of hydrocortisone and cortisone or the 16-methyl derivatives thereof, first as the 4,5-dihydro-3β-hydroxy or -3β-tetrahydropyranyloxy or -3-ketal compounds. The C-3 ether groups can be cleaved, the 3-hydroxyl oxidized to the keto, and the $\Delta^4$ unsaturation introduced according to the conventional procedures described hereinafter. The 3-keto-$\Delta^4$ compounds are further elaborated as respect the introduction of C-6 and C-9 halo groups, $\Delta^1$ unsaturation, C-11 hydroxy, and so forth to prepare such useful compounds as flumethasone, prednisolone, prednisone, fluocinolone acetonide, and the like.

Thus, the present process finds most practical use utilizing simple 17-oxo starting compounds to prepare basic pregnanes which can be elaporated further. The specific choice of a starting material and the further elaboration is within the ordinary level of skill in the steroid art in accordance with the present disclosure.

In the preferred embodiments hereof, the present invention is useful for the preparation of 17α-hydroxy-20-keto-21-acyloxy compounds having the following formulas (A) and (B):

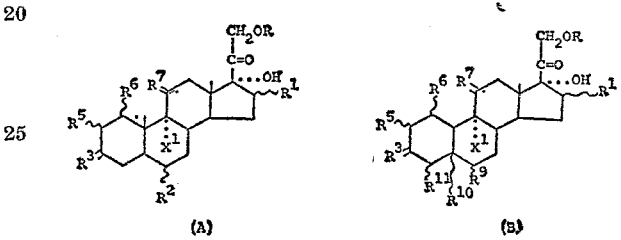

wherein

R is carboxylic acyl of from one to eight carbon atoms, inclusive;

$R^1$ is hydrogen, lower alkyl, halogenated methyl, hydroxy or a conventional hydrolyzable ester or ether thereof;

$R^2$ is hydrogen, fluoro, chloro, bromo, or methyl;

$R^3$ is oxo, ethylenedioxy or the group

wherein $R^4$ is hydrogen, hydroxy or a conventional hydrolyzable ester or ether thereof;

$R^5$ is hydrogen, alkyl, halogen, hydroxy, or a conventional hydrolyzable ester thereof;

$R^6$ is hydrogen alkyl, halogen, hydroxy or a conventional hydrolyzable ester thereof, or when taken together with $R^5$, oxido or methylene;

$R^7$ is oxo or the group

wherein $R^8$ is hydrogen, hydroxy, or chloro;

$X^1$ is hydrogen, fluoro, chloro or bromo, provided $X^1$ is chloro when $R^8$ is chloro;

$R^9$ is hydrogen, bromo, hydroxy or a conventional hydroyzable ester thereof;

$R^{10}$ is hydrogen, bromo, hydroxy, or a conventional hydrolyzable ester thereof, or taken together with $R^9$, oxido; and $R^{11}$ is hydrogen, hydroxy or a conventional hydrolyzable ester thereof.

The compounds represented by the above Formulas A and B possess anti-inflammatory activity and are thus useful, as set forth above. In addition, however, the compounds of Formulas A and B are also useful as intermediates for the preparation of other cortical steroids which also possess varying degrees of corticoid activtiy making them also useful in the treatment of various inflammatory conditions.

As indicated above, these compounds can be prepared directly from the corresponding 17-oxo compounds or they are obtainable, in the preferred embodiments, upon further elaboration of a basic pregnane product. The compounds depicted and defined above which can be prepared in accordance with the processes hereof can be converted via conventional means known to one skilled in the art, to other useful derivatives. The C–21 ester can be hydrolyzed such as with potassium hydroxide or potassium carbonate in methanol or the C–17α hydroxyl group can be esterified by the use of carboxylic acid anhydride in the presence of acetic acid and p-toluenesulfonic acid.

The 21-hydroxyl can be esterified to an alternate ester with the appropriate acid anhydride in pyridine. Similarly, the hydroxyls can be etherified to the conventional tetrahydropyran-2'-yloxy and tetrahydrofuran-2'-yloxy and cyclopentyloxy ethers in accordance also with methods known in the art.

Further, the 3-keto compounds are obtained by oxidation (with chromic acid in pyridine) of a 3-hydroxy compound and the 3-keto compounds are then treated with bromine in acetic acid in the presence of hydrogen bromide to yield the corresponding 2,4-dibromo-3-keto compound. This dibromo adduct is refluxed with sodium iodide in 2-pentanone to yield the corresponding 2-iodo-3-keto-$\Delta^4$ compound which, when refluxed with collidine, yields the corresponding 3-keto-$\Delta^4$ derivative. By refluxing the 3-keto-$\Delta^4$ derivatives with 2,3-dichloro-5,6-dicyano-1,4-benzoquinone in dioxane, the corresponding 3-keto-$\Delta^{1,4}$ derivative is obtained. By refluxing the 3-keto-$\Delta^4$ derivative with chloranil and xylene, the corresponding 3-keto-$\Delta^{4,6}$ derivative is obtained. The corresponding 11β-hydroxy derivatives of the above depicted and defined compounds are prepared by incubating the C–11 dihydro compounds with any hydroxylating microorganism, such as *Cunninghamella bainieri* or *Curvularia lunata*, in an appropriate nutrient medium or by selective reduction of a 11-keto group. Protection is preferably provided for those groups which may compete or interfere with the principle reactions hereof. The examples of such protection include forming the ketal or enol ethers of the 3-keto function which may be restored later in the synthetic sequence. Also, the oxidation step hereof requires that any hydroxyl groups which are present on the starting material be protected by either esterifying them with a carboxylic acid anhydride such as acetic anhydride, propionic anhydride, caproic anhydride, and the like in a tertiary amine solvent such as triethyl amine, pyridine, quinoline, and the like or by etherification. A mild subsequent hydrolysis restores the hydroxyl group.

In accordance with the above products which can be prepared in accordance with the preferred embodiments hereof in accordance with the generic process of the present invention, the starting materials of which are represented above by partial Formula 1, are optionally substituted with alkyl, halogenated alkyl, hydroxy, acyloxy, halogeno, alkoxy, oxido, methylene, acetyl, ketal, cyano, and the like. For example, the starting materials can be substituted with a 2,3-isopropylidenedioxy, 1-acetylthio, 1-cyano-1,2-oxido, 2-alkyl, 2-formyl, 2-halo, 4-hydroxy, 4-acetoxy-4-halo, 5-hydroxy, 5-acetoxy, 4,5-oxido, 6-hydroxy, 6-acetoxy, 6-halogenated methyl, 6-fluoro, 6-methyl, 5,6-oxido, 9-halo, 11-keto, 11-hydroxy, 11-halo, 9,11-oxido, 12-alkyl, 12-hydroxy, 15-alkyl, 15-hydroxy, 16-alkanoyloxy, 16-alkyl, 16-halogenated methyl, 15,16-oxido, 18-alkyl, 19-alkyl, 19-hydroxy, 19-carboxy, and the like.

The starting compounds can be prepared by treating a 17-keto androstane with methylene triphenylphosporane to yield the corresponding 17-methylene androstne, and treating the resulting 17-methylene androstane with a dihalocarbene, wherein the halogen is bromo or chloro, to yield the corresponding 17-spiro-(gem-dihalocyclopropyl)-androstane as described in U.S. application Ser. No. 854,746 filed on even date herewith, by John H. Fried for Intermediates and Process for Preparing Useful 17α-Hydroxy-20-Keto and 17α,21-Dihydroxy-20-Keto Pregnanes and Derivatives Thereof, which is hereby incorporated by reference.

Representative starting compounds include the following:

6α-methyl-17-spiro(2',2'-dibromocyclopropyl)-androstan-3β-ol,

6β,16α-dimethyl-17-spiro-(2'-bromo-2'-chlorocyclopropyl)-androstan-3β-ol,

6α-methyl-17-spiro-(2',2'-dibromocyclopropyl)-androstane-3β,11β-diol,

6α-fluoro-17-spiro-(2',2'-dibromocyclopropyl)-androstan-3β-ol, and

1β,2β-methylene-17-spiro-(2',2'-dibromocyclopropyl)-androstan-3β-ol.

In the present specification and claims, the following definitions apply.

The wavy line (∼∼∼) used in the depicted formulas indicate that the substituents attached to those positions can be either in the configuration alpha ($\alpha$) or beta ($\beta$) or mixtures thereof.

The term "conventional hydrolyzable ester" denotes those hydrolyzable ester groups conventionally employed in the steroid art, preferably, those derived from hydrocarbon carboxylic acids. The term "hydrocarbon carboxylic acid" defines both substituted and unsubstituted hydrocarbon carboxylic acids. These acids can be completely saturated or possess varying degrees of unsaturation (including aromatic), can be of straight chain, branched chain or cyclic structure, and preferably contain from 1 to 12 carbon atoms. In addition, they can be substituted by functional groups, for example, hydroxy, alkoxy containing up to six carbon atoms, acyloxy containing up to twelve carbon atoms, nitro, amino, halogeno, and the like, attached to the hydrocarbon backbone chain. Typical conventional hydrolyzable esters thus included within the scope of the term and the instant invention are acetate, propionate, butyrate, valerate, caproate, enanthate, caprylate, pelargonate, acrylate, undecenoate, phenoxyacetate, benzoate, phenylacetate, diphenylacetate, diethylacetate, trimethylacetate, t-butylacetate, trimethylhexanoate, methylneopentylacetate, cyclohexylacetate, cyclopentylpropionate, adamantoate, glycolate, methoxyacetate, hemisuccinate, hemiadipate, hemi-β,β-dimethylglutarate, acetoxyacetate, 2 - chloro - 4 - nitro benzoate, aminoacetate, diethylaminoacetate, piperidinoacetate, β-chloropropionate, trichloroacetate, β-chlorobutyrate, bicyclo-[2.2.2]-octane-1-carboxylate, methylbicyclo-[2.2.2]-oct-2-ene-1-carboxylate, and the like. The preferred conventional hydrolyzable ester is acetate.

"Conventional hydrolyzable ethers" include the cyclopentyl, tetrahydrofuran-2-yloxy, tetrahydropyran-2-yloxy, and 4-methoxytetrahydropyran-4-yloxy. The term "lower alkyl" defines aliphatic hydrocarbons of from one to six carbon atoms including all isomers thereof. Typical lower alkyl groups are methyl, ethyl, isopropyl, t-butyl, isoamyl, and n-hexyl.

The term "halogenated methyl" defines a methyl group substituted with one, two or three halogen groups, preferably chloro and fluoro. Typical halogenated methyl groups include fluoromethyl, chloromethyl, difluoromethyl, trichloromethyl, trifluoromethyl, and the like.

The following preparations and examples typify the manner by which the present invention can be practiced and represent, in one aspect, the best mode for carrying out the invention. As such, however, they should be construed merely as illustrative and not as limitative upon the overall scope thereof.

PREPARATION 1

17-methylene-5α-androstan-3β-ol

Part A: To 350 ml. of dimethyl sulfoxide, there is added 25.5 g. of sodium hydride (washed several times with nonaqueous hexane). The resulting mixture is heated at 70 to 75° C. for 45 minutes. The resulting solution is then cooled in an ice-water bath, and 121 g. of methyl triphenylphosphonium bromide in 500 ml. of dimethyl sulfoxide are added. The resulting solution is stirred at room temperature for 2½ hours; then a solution of 27 g. of 5α-androstan-3β-ol-17-one in 500 ml. of dry benzene is added dropwise to the methylene triphenylphosphorane solution and the resulting mixture stirred while heating at 85° C. for 14 hours. After cooling to room temperature, the reaction mixture is poured into ice-water and extracted with hexane. The organic phase is washed with water, dried over sodium sulfate and evaporated. The crystalline residue is purified on chromatographic magnesium silicate eluting with hexane: ethylacetate (9:1) to yield 17-methylene-5α-androstan-3β-ol.

17-spiro-(gem-dibromocyclopropyl)-5α-androstan-3β-ol

Part B–1: A suspension of potassium t-butoxide is prepared from 2.6 g. of potassium and 42 ml. of anhydrous t-butanol. One gram of 17-methylene-5α-androstan-3β-ol dissolved in 50 ml. of dry benzene is added to the suspension at room temperature. A solution of 2.5 g. of bromoform in 20 ml. of anhydrous benzene is then added dropwise into the stirred reaction mixture maintained at reflux. After the addition is complete, the refluxing is continued for an additional hour. The resulting mixture is then poured into ice-water and extracted with ether. The ethereal extracts are combined, washed with water, dried over sodium sulfate and evaporated. The residue is chromatographed on a silica-gel column, eluting with hexane:ethyl acetate (4:1) to yield 17-spiro-(2',2'-dibromocyclopropyl) - 5α - androstan-3β-ol and 17-spiro-(3',3'-dibromocyclopropyl)-5α-androstan-3β-ol.

17-spiro-(gem-dibromocyclopropyl)-5α-androstan-3β-ol

Part B–2: One gram of 17-methylene-5α-androstan-3β-ol and 2.7 grams of phenyltribromomethyl mercury are dissolved in 50 ml. of dry benzene and the resulting mixture is refluxed for three hours under an atmosphere of nitrogen. There is then added one additional gram of the mercury reagent and reflux is continued for an additional five hours after this period. After the five hour reflux period, 1.7 additional grams of mercury reagent are added and the resultant mixture refluxed for ten hours after which time 1.1 additional grams of mercury reagent are added. After the last addition, the reaction is allowed to reflux for six hours. The reaction mixture is then filtered and the filtrate is evaporated to dryness providing an oil which is chromatographed on silica gel. The fractions are eluted with hexane-ethyl acetate to provide the 17-spiro-(2',2' - dibromocyclopropyhy)-5α-androstan-3β-ol and 17-spiro-(3',3'-dibromocyclopropyhy) - 5α - androstan-3β-ol products.

PREPARATION 2

9α-fluoro-17-methyl-5α-androstane-3β,11β-diol

Part A: A mixture of 1 l. of dimethylsulfoxide and one mole of lithium hydride is prepared and heated for one hour at about 70° C. The resulting mixture is cooled and to the cooled mixture are added 357 g. of methyl triphenylphosphonium bromide dispersed in 1.5 l. of dimethylsulfoxide. The mixture is maintained under a nitrogen atmosphere. The resulting reaction mixture is stirred for five hours at room temperature. After this time a solution of 364 g. of 3β-acetoxy-9α-fluoro-5α-androstan-11β-ol-17-one in 7.5 l. of xylene is slowly added with stirring. After the addition is complete, the mixture is stirred and heated to and maintained at 50° C. for 48 hours. The reaction mixture is then allowed to cool, is poured into ice water and extracted with methylene chloride. The extracts are combined, washed with water, dried over sodium sulfate and evaporated. The residue is chromatographed on magnesium silicate, eluting with hexane:ethyl acetate (9:1) to yield 9α-fluoro-17-methylene-5α-androstane-3β,11β-diol.

9α-fluoro-17-spiro-(gem-dichlorocyclopropyl)-
5α-androstane-3β,11β-diol

Part B: To a refluxisg mixture of 258 g. of 9α-fluoro-17-methylene-5α-androstane-3β,11β-diol, 90 g. of potassium tertiary pentoxide, 5 liters of tertiary amyl alcohol, and 13 l. of dry toluene, there is slowly added a solution of 100 g. of chloroform dispersed in 1 l. of anhydrous toluene. After the addition, the mixture is refluxed for an additional five hours; then it is cooled and poured into ice water. The resulting aqueous mixture is extracted with diethyl ether; the extracts are combined, washed with water, dried over sodium sulfate and evaporated. The residue is chromatographed on silica-gel eluting with hexane:ethyl acetate (4:1) to yield 9α-fluoro-17-spiro-(2',2'-dichlorocyclopropyl)-5α-androstane - 3β,11β - diol and 9α - fluoro-17-spiro-(3',3' - bromocyclopropyl-5α-androstane-3β,11β-diol.

By employing 132 grams of bromodichloromethane and 168 grams of chlorodibromethane in place of chloroform in the above process, the following are obtained, respectively: 9α-fluoro-17-spiro-(2',2' - dichlorocyclopropyl)-5α-androstane-3β,11β-diol and the 3',3'-dichlorocyclopropyl derivative thereof.

PREPARATION 3

16α-methyl-17-methylene-5α-androstane-3β-ol-11-one

Part A: A mixture of 25 ml. of dimethylformamide and 1 gram of potassium hydride is prepared. To the resulting mixture is added a solution of two grams of methyl triphenylphosphonium bromide dispersed in 50 ml. of dimethylformamide. The resulting reaction mixture is stirred for 5 hours at room temperature. After this period, a solution of 1 gram of 3β-propionyl oxy-16α-methyl-5α-androstane-11,17-dione (prepared from 16α - methyl-androst-4-ene-3,11,17-trione by selectively reducing the latter with lithium aluminum hydride and tetrahydrofuran to yield the corresponding 3-hydroxy compound, selectively hydrogenating this with a molar equivalent of hydrogen gas in the presence of a 5% palladium-on-charcoal catalyst, and then esterifying with propionic anhydride in pyridine) in 2.5 liters of toluene are slowly added thereto with stirring. After the addition is complete, the mixture is stirred while heating at 50° C. for 48 hours. The reaction mixture is then allowed to cool, is poured into ice water and extracted with methylene chloride. The extracts are combined, washed with water, dried over sodium sulfate and evaporated. The residue is chromatographic magnesium, silicate, eluting with hexane:ethyl acetate (9:1) to yield 16α-methyl-17-methylene-5α-androstan-3β-ol-11-one.

16α-methyl-17-spiro-(gem-dibromocyclopropyl)-
5α-androstan-3β-ol-11-one

Part B–1: To a refluxing mixture of 186 g. of 16α-methyl-17-methylene-5α-androstan-3β-ol-11-one, 207 g. of sodium, 3.5 liters of tertiary pentanol and 0.5 liters of anhydrous xylene, there is slowly added a solution 759 g. of bromoform in 4.5 liters of anhydrous toluene. After the addition, the mixture is refluxed for an additional three hours. It is then cooled and poured into ice water. The resulting aqueous mixture is extracted with diethyl ether, the extracts are combined, washed with water, dried over sodium sulfate and evaporated. The residue is chromatographed on silica-gel eluting with hexane:ethyl acetate (4:1) to yield 16α-methyl-17-spiro-(2',2'-dibromocyclopropyl)-5α-androstan-3β-ol-11-one and 16α-methyl-17-spiro-(3',3'-dibromocycloporpyl) - 5α - androstan-3β-ol-11-one.

16α-methyl-17spiro-(gem-dibromocyclopropyl)-
5α-androstan-3β-ol-11-one

Part B–2: The procedure set forth in Part B–2 of Preparation 1 is repeated using 16α-methyl-17-methylene-5α-androstan-3β-ol-11-one as the starting compound to provide the corresponding 16α-methyl-17-spiro-(2',2'-dibromocyclopropyl) - 5α - androstan-3β-ol-11-one and 16α-methyl-17-spiro-(3',3'-dibromocyclopropyl) - 5α - androstan-3β-ol-11-one products.

PREPARATION 4

3,3-ethylenedioxy-17-methylene-5α-androstan-16α-ol

Part A: To 350 ml. of dimethyl sulfoxide, there are added 25.5 grams of sodium hydride (washed several times with nonaqueous hexane). The resulting mixture is heated at 70 to 75° C. to 45 minutes. The resulting solution is cooled in an ice water bath, and 121 g. of methyl triphenylphosphonium bromide in 500 ml. of dimethyl sulfoxide are added. The resulting solution is stirred at room temperature for 2½ hours. After this time, a solution of 27 g. of 3,3-ethylenedioxy-5α-androstan-16α-ol-17-one in 500 ml. of dry benzene is added dropwise to the methylene triphenylphosphorane solution and the resulting mixture stirred and heated at 85° C. for 14 hours. After cooling to room temperature, the reaction mixture is poured into ice water and extracted with hexane. The organic phase is washed with water, dried over sodium sulfate and evaporated. The crystalline residue is purified on chromatographic magnesium silicate eluting with hexane:ethyl acetate (9:1) to yield 3,3-ethylenedioxy-17-methylene-5α-androstan-16α-ol.

Similarly, 3β - tetrahydroxypyran-2'-yloxy-17-methylene-5α-androstan - 16α - ol is prepared from 3α-tetrahydroxypyran-2'-yloxy-5α-androstan-16α-ol-17-one.

3,3-ethylenedioxy-17-(gem-dibromocyclopropyl)-5α-androstan-16α-ol

Part B: A suspension of potassium t-butoxide is prepared from 2.6 grams of potassium and 42 ml. of anhydrous t-butanol. One gram of 3,3 - ethylenedioxy-17-methylene-5α-androstan-16α-ol dissolved in 50 ml. of dry benzene is added to the suspension at room temperature. A solution of 2.5 g. of bromoform in 20 ml. of anhydrous benzene is then added dropwise and with stirring to the refluxing reaction mixture. After the addition is complete, the refluxing in continued for an additional hour. The resulting mixture is then poured into ice water and extracted with ether. The ethereal extracts are combined, washed with water, dried over sodium sulfate and evaporated. The residue is chromatographed on a silica-gel column, eluting with hexane:ethyl acetate (4:1) to yield 3,3 - ethylenedioxy-17-spiro-(2',2'-dibromocyclopropyl)-5α-androstan-16α-diol and 3,3-ethylenedioxy-17-spiro-(3',3'-dibromocyclopropyl)-5α-androstan-16α-ol.

PREPARATION 5

6α-methyl-9α-fluoro-17-methylene-5α-androstan-3β,11β-diol

Part A: A mixture of 1 liter of dimethylsulfoxide and 72 grams of sodium hydride was heated for one hour (about 70° C.). The resulting mixture is cooled and to the cooled mixture are added 357 g. of methyl triphenylphosphonium bromide in 1.5 liters of dimethylsulfoxide. The resulting reaction mixture is stirred for 5 hours at room temperature; then a solution of 382 g. of 3β-acetoxy-6α-methyl-9α-fluoro-5α-androstan - 11,17 - dione and 7.5 liters of xylene is slowly added with stirring. After the addition is complete, the mixture is stirred and heated to 50° C. and maintained under these conditions for 48 hours. The reaction mixture is allowed to cool, then is poured into ice water and extracted with methylene chloride. The extracts are combined, washed with water, dried over sodium sulfate and evaporated. The residue is chromatographed on magnesium silicate, eluting with hexane:acetate (9:1) to yield 6α - methyl-9α-fluoro-17-methylene-5α-androstane-3β,11β-diol.

6α-methyl-9α-fluoro-17-spiro-(gem-dichlorocyclopropyl)-5α-androstane-3β,11β-diol Part B-1: To a refluxing mixture of 272 g. of 6α-methyl-9α-fluoro - 17 - methylene-5α-androstane-3β,11β-diol, 90 g. of potassium tertiary butoxide, 5 liters of tertiary butanol, and 13 liters of dry toluene, there is slowly added a solution of 100 g. of chloroform and 1 liter of anhydrous toluene. After the addition, the mixture is refluxed for an additional 5 hours; then it is cooled and poured into ice water. The resulting aqueous mixture is extracted with diethyl ether; the extracts are combined, washed with water, dried cver sodium sulfate and evaporated. The residue is chromatographed on silicagel eluting with hexane:ethyl acetate (4:1) to yield 6α-methyl-9α-fluoro - 17 - spiro-(2',2'-dichlorocyclopropyl)-5α - androstane-3β,11β-diol and 6α-methyl-9α-fluoro-17-spiro-(3',3' - dichlorocyclopropyl)-5α-androstane-3β,11β-diol.

By employing 132 g. of bromodichloromethane and 168 g. of chlorodibromomethane in place of chloroform in the above process, the following are obtained, respectively: 6α-methyl-9α-fluoro - 17 - spiro-(2',2'-dichlorocyclopropyl)-5α-androstane-3β,11β-diol and the 3',3'-dichlorocyclopropyl derivative thereof, and 6α-methyl-9α-fluoro-17-spiro-(2'-bromo-2'-chlorocyclopropyl) - 5α - androstane-3β,11β-diol and the 3'-chloro-3'-bromocyclopropyl derivative thereof.

6α-methyl-9α-fluoro-17-spiro-(gem-dichlorocyclopropyl)-5α-androstane-3β,11β-diol Part B-2: The procedure of Part B-2 of Preparation 1 is repeated using phenyltrichloromethyl mercury to afford the same product compounds as prepared in Part B-1 of this preparation.

PREPARATION 6

6β,16α-dimethyl-17-methylene-5α-androstane-3β-ol

Part A: A mixture of 4-liters of dimethylsulfoxide and 288 g. of sodium hydride was heated for 1 hour at 10° C. The resulting mixture is cooled and a mixture of 1076 g. of methyl triphenylphosphonium bromide in 4 liters of dimethylsulfoxide is added thereto. The resulting reaction mixture is stirred for 5 hours at room temperature; then a solution of 215 g. of 3β-propionyloxy-6β,16α-dimethylandrostane-17-one and 2.5 liters of toluene is slowly added with stirring. After the addition is complete, the mixture is stirred and heated to 50° C. for 48 hours. The reaction mixture is allowed to cool, then is poured into ice water and extracted with methylene chloride. The extracts are combined, washed with water, dried over sodium sulfate and evaporated. The residue is chromatographed on chromatographic magnesium silicate, eluting with hexane:ethyl acetate (9:1) to yield 6β,16α-dimethyl-17-methylene-5α-androstan-3β-ol.

6β,16α-dimethyl-17-spiro-(gem-dibromocyclopropyl)-5α-androstan-3β-ol

Part B: To a refluxing mixture of 186 g. of 6β,16α-dimethyl-17-methylene-5α-androstan-3β-ol, 56 g. of lithium, 3.5 liters of tertiary butanol and 0.5 liters of anhydrous xylene, there is slowly added a solution of 759 g. of bromoform and 4.5 liters of anhydrous toluene. After the addition, the mixture is refluxed for 3 hours; then it is cooled and poured into ice water. The resulting aqueous mixture is extracted with diethyl ether. The extracts are combined, washed with water, dried over sodium sulfate and evaporated. The residue is chromatographed on silica-gel eluting with hexane:ethyl acetate (4:1) to yield 6β,16α - dimethyl-17-spiro-(2',2'-dibromocyclopropyl)-5α-androstan-3β-ol and 6β,16α-dimethyl - 17 - spiro-(3',3'-dibromocyclopropyl)-5α-androstan-3β-ol.

EXAMPLE 1

21-acetoxy-20-bromo-5α-pregn-17(20)-en-3β-ol and 3β,21-diacetoxy-20-bromo-5α-pregn-17(20)-ene To a solution of 405 mg. of 17-spiro-(gem-dibromocyclopropyl)-5α-androstan-3β-ol in 15 ml. of glacial acetic acid there are added 400 mg. of silver acetate. The resulting solution is stirred and heated under nitrogen at reflux temperature for 15 minutes. It is then cooled.

After cooling, the reaction mixture is filtered, and the filtered residue is washed with ether. The filtrate and the washings are combined and then the ethereal layer is washed with water, aqueous sodium bicarbonate solution and water, dried over sodium sulfate and evaporated. The residue is purified on a silica-gel column eluting with hexane:ethyl acetate (4:1) to yield the 21-acetoxy-20-bromo-5α-pregn-17(20)-en-3β-ol product.

Conventional acetylation with acetic anhydride in pyridine, at room temperature, provides the 3β,21-diacetoxy-20-bromo-5α-pregn-17(20)-ene product.

EXAMPLE 2

3β,21-diacetoxy-5α-pregnan-17α-ol-20-one

Part A: To a solution of 805 mg. of 3β,21-diacetoxy-20-bromo-5α-pregn-17(20)-ene dispersed in 80 ml. of diethyl ether, there is added 1.0 g. of osmium tetroxide and three drops of water. The reaction mixture is allowed to stand at room temperature for 10 days and is then filtered through celite. The ethereal filtrate is washed with sodium thiosulfate solution and water, dried over sodium sulfate and evaporated. The residue is purified on chromatographic magnesium silicate eluting with hexane and then with hexane:ethyl acetate (4:1) to yield the 3β,21-diacetoxy-5α-pregnane-17α-ol-20-one.

Similarly, 21-acetoxy-5α-pregnane-3β,17α-diol-20-one is prepared from 21-acetoxy-20-bromo-5α-pregn-17(20)-en-3β-ol.

3β,21-diacetoxy-5α-pregnan-17α-ol-20-one

Part B: To a solution of 450 mg. of 3β,21-diacetoxy-20-bromo-5α-pregn-17(20)-ene dispersed in 15 ml. of anhydrous tetrahydrofuran are added 230 mg. of 85% m-chloroperbenzoic acid. The resultant reaction mixture is allowed to stand at room themperature for 4 days. After this period it is diluted with ether and the resultant mixture is washed with 5% sodium bicarbonate solution and water, dried over sodium sulfate and evaporated. The residue after evaporation is chromatographed on silica-gel to provide the 3β,21-diacetoxy-5α-pregnan-17α-ol-20-one product.

Similarly, 21-acetoxy-5α-pregnane-3β,17α-diol-20-one is prepared from 21acetoxy-20-bromo-5α-pregn-17(20)-en-3β-ol.

EXAMPLE 3

9α-fluoro-20-chloro-21-acetoxy-5α-pregn-17(20)-ene-3β,11β-diol

Part A: A mixture of 188 g. of 9α-fluoro-17-spiro-(gem-dichlorocyclopropyl)-5α-androstane-3β,11β-diol and 2.5 liters of tetrahydrofuran are added to a solution of 128 grams of silver fluoride in 7.5 liters of glacial acetic acid. The resulting mixture is purged with nitrogen gas and heated to reflux for 5 minutes. The reaction mixture is then cooled and filtered; the filtered material is washed with several portions of diethyl ether. The filtrate and ether washings are combined, washed with water, aqueous 5% sodium carbonate and water, dried over sodium sulfate and evaporated. The residue is chromatographed on silica-gel eluting with hexane:ethyl acetate (5:1) to yield 9α-fluoro - 20 - chloro - 21 - acetoxy-5α-pregn-17(20)-ene-3β,11β-diol.

3β,21-diacetoxy-9α-fluoro-20-chloro-5α-pregn-17(20)-en-11β-ol

Part B: A mixture of 161 g. of 9α-fluoro-20-chloro-21-acetoxy-5α-pregn-17(20)-ene-3β,11β-diol, 700 ml. of pyridine and 350 ml. of acetic anhydride is allowed to stand at room temperature for 15 hours. The mixture is then poured into ice water and the solid which forms is collected by filtration, washed with water and dried to yield 3β,21-diacetoxy-9α-fluoro - 20 - chloro-5α-pregn-17(20)-en-11β-ol which may be further purified through recrystallization from acetone:hexane.

Similarly, by using propionic anhydride and caproic anhydride in place of acetic anhydride in the above process, 3β-propionyloxy- 9α-fluoro-20-chloro-21acetoxy-5α-pregn-17(20)-en-11β-ol and 3β-caproyloxy-9α-fluoro-20-chloro-21-acetoxy-5α-pregn-17(20)-en-11βol are respectively obtained.

EXAMPLE 4

3β,21-diacetoxy-9α-fluoro-5α-pregnane-11β,17α-diol-20-one

A mixture of 175 g. of 3β,21-diacetoxy-9α-fluoro-20-chloro-5α-pregn-17(20)-en-11β-ol and 1.5 liters of diisopropyl ether is added to a mixture of 102 g. of osmium tetroxide, 500 ml. of diisopropyl ether and 5 ml. of water. The resulting mixture is stirred for 4 days at 40° C., cooled and filtered. The filtrate is then washed with aqueous sodium thiosulfate solution and water, dried over magnesium sulfate and evaporated. The residue is chromatographed on chromatographic magnesium silicate eluting with isooctane to yield 3β,21-diacetoxy-9α-fluoro-5α-pregnane-11β,17α-diol-20-one.

EXAMPLE 5

16α-methyl-20-bromo-21-acetoxy-5α-pregn-17(20)-en-3β-ol-11-one

Part A: A mixture of 218 g. of 16α-methyl-17-spiro-(gem-dibromocyclopropyl)-5α-androstan-3β-ol-11-one and 5 liters of dioxane are added to a solution of 408 g. of silver nitrate in 5 liters of glacial acetic acid. The resulting mixture is purged with nitrogen gas and heated to 40° C. for 50 minutes. The reaction mixture is then cooled and filtered. The filtered material is washed with several portions of diethyl ether. The filtrate and ether washings are combined, washed with water, aqueous 5% sodium carbonate and water, dried over sodium sulfate and evaporated. The residue is chromatographed on silica-gel eluting with hexane:ethyl acetate (5:1) to yield 16α-methyl-20-bromo-21-acetoxy-5α-pregn-17(20)-en-3β-11-one.

A similar result is obtained with 460 g. of silver chlorate, 370 g. of silver nitrite, 435 g. of silver propionate or 500 g. of silver perchlorate when used in place of silver nitrate in the above process. Similarly, the above are carried out with propionic acid and butyric acid, each in place of acetic acid to afford the corresponding 21-propionate and 21-butyrate ester products.

3β,21-diacetoxy-16α-methyl-20-bromo-5α-pregn-17(20)-ene-11-one

Part B: A mixture of 204 g. of 16α-methyl-20-bromo-21-acetoxy-5α-pregn-17(20)-en-3β-ol-11-one, 600 ml. of pyridine and 300 ml. of acetic anhydride is allowed to stand at room temperature for 24 hours. The mixture is then poured into ice water and the solid which forms is collected by filtration, washed with water and dried to yield 3β,21 - diacetoxy-16α-methyl-20-bromo-5α-pregn-17-(20)-en-11-one which is further purified through recrystallization from acetone:hexane.

EXAMPLE 6

3β,21-diacetoxy-16α-methyl-5α-pregnan-17α-ol-11,20-dione

Part A: To a solution of 805 mg. of 3β,21-diacetoxy-16α-methyl - 20 - bromo-5α-pregn-17(20)-en-11-one dispersed in 80 ml. of diethyl ether, there is added 1.0 g. of osmium tetroxide and three drops of water. The reaction mixture is allowed to stand at room temperature for 10 days and is then filtered through celite. The ethereal filtrate is washed with sodium thiosulfate solution and water, dried over sodium sulfate and evaporated. The residue is purified on chromatographic magnesium silicate eluting with hexane and then with hexane:ethyl acetate (4:1) to yield 3β,21-diacetoxy-16α-methyl-5α-pregnan-17α-ol-11,20-dione.

3β,21-diacetoxy-16α-methyl-5α-pregnan-17α-ol-
11,20-dione

Part B: To a solution of 450 mg. of 3β,21-diacetoxy-16α-methyl - 20 - bromo-5α-pregn-17(20)-en-11-one dispersed in 15 ml. of anhydrous tetrahydrofuran are added 350 mg. of peracetic acid. The resultant reaction mixture is allowed to stand at room temperature for 4 days. After this period it is diluted with ether and the resultant mixture is washed with 5% sodium bicarbonate solution and water, dried over sodium sulfate and evaporated. The residue after evaporation is chromatographed on silica-gel to provide the 3β,21-diacetoxy-16α-methyl-5α-pregnan-17β-ol-11,20-dione product.

EXAMPLE 7

3,3-ethylenedioxy-20-bromo-21-acetoxy-5α-pregn-17(20)-en-16α-ol

To a solution of 405 mg. of 3,3-ethylenedioxy-17-spiro·(gem-dibromocyclopropyl)-5α-androstan-16α-ol in 15 ml. of glacial acetic acid, there are added 400 mg. of silver acetate. The resulting solution is stirred and heated under nitrogen at reflux temperature for 15 minutes and then it is cooled. After cooling the reaction mixture is filtered, and the filtered residue is washed with ether. The ethereal filtrate is washed with water, aqueous sodium bicarbonate solution and water, dried over sodium sulfate and evaporated. The residue is purified on a silica-gel column eluting with hexane:ethyl acetate (4:1) to yield 3,3-ethylenedioxy-20-bromo-21-acetoxy-5α-pregn-17(20)-en-16α-ol.

The foregoing is similarly conducted in valeric, caproic, enanthic, and caprylic acid to afford the corresponding 21-valerate, -caproate, -enanthate, and -caprylate ester products.

EXAMPLE 8

3,3-ethylenedioxy-21-acetoxy-5α-pregnan-17α-ol-20-one

To a solution of 805 mg. of 3,3-ethylenedioxy-20-bromo-21-acetoxy-5α-pregn-17(20)-ene in 80 ml. of ether, there is added 1.0 g. of osmium tetroxide and three drops of water. The reaction mixture is allowed to stand at room temperature for 10 days; then it is filtered. The ethereal filtrate is washed with sodium thiosulfate solution and water, dried over sodium sulfate and evaporated. The residue is purified on chromatographic magnesium silicate eluting with hexane and then with hexane:ethyl acetate (4:1) to yield 3,3-ethylenedioxy-21-acetoxy-5α-pregnan-17α-ol-20-one.

Conventional hydrolysis with hydrogen chloride in acetone yields 21-acetoxy-5α-pregnan-17α-ol-3,20-dione.

EXAMPLE 9

6α-methyl-9α-fluoro-20-chloro-21-acetoxypregn-17(20)-ene-3β,11β-diol

A mixture of 200 g. of 6α-methyl-9α-fluoro-17-spiro-(gem-dichlorocyclopropyl)-5α-androstane-3β,11β-diol and 2.5 liters of tetrahydrofuran are added to a solution of 128 g. of silver fluoride in 7.5 liters of glacial acetic acid. The resulting mixture is purged with nitrogen gas and heated to reflux for 5 minutes. The reaction mixture is then cooled and filtered. The filtered material is washed with several portions of diethyl ether. The filtrate and ether washings are combined, washed with water, aqueous 5% sodium carbonate and water, dried over sodium sulfate and evaporated. The residue is chromatographed on silica-gel eluting with hexane:ethyl acetate (5:1) to yield 6α-methyl-9α-fluoro-20-chloro-21 - acetoxy-5α-pregn-17(20)-ene-3β,11β-diol.

EXAMPLE 10

6α-methyl-9α-fluoro-21-acetoxy-5α-pregnane-3β,11β,17α-triol-20-one

A mixture of 185 g. of 6α-methyl-9α-fluoro-20-chloro-21-acetoxy-5α-pregn-17(20)-ene-3β,11β-diol and 1.5 liters of diisopropyl ether is added to a mixture of 102 g. of osmium tetroxide, 500 ml. of diisopropyl ether and 5 ml. of water. The resulting mixture is stirred for 4 days at 40° C., cooled and filtered. The filtrate is washed with aqueuos sodium thiosulfate solution and water, dried over magnesium sulfate and evaporated. The residue is chromatographed on chromatographic magnesium silicate eluting with isooctane to yield 6α-methyl-9α-fluoro-21-acetoxy-5α-pregnane-3β,11β,17α-triol-20-one.

EXAMPLE 11

6β,16α-dimethyl-20-bromo-21-acetoxy-5α-pregn-17(20)-en-3β-ol

A mixture of 218 g. of 6β,16α-dimethyl-17-spiro-(gem-dibromocyclopropyl)-5α-androstan-3β-ol, and 5 liters of dioxane are added to a solution of 408 g. of silver nitrate in 5 liters of glacial acetic acid. The resulting mixture is purged with nitrogen gas and heated to 40° C. for 50 minutes. The reaction mixture is then cooled filtered; the filtered material is washed with several portions of diethyl ether. The filtrate and ether washings are combined, washed with water, aqueous 5% sodium carbonate and water, dried over sodium sulfate, and evaporated. The residue is chromatographed on silica-gel eluting with hexane:ethyl acetate (5:1) to yield 6β,16α-dimethyl-20-bromo-21-acetoxy-5α-pregn-17(20)-en-3β-ol.

A similar result is obtained with 460 g. of silver chlorate, 370 g. of silver nitrite, 435 g. of silver propionate or 500 grams of silver perchlorate are used in place of silver nitrate in the above process.

EXAMPLE 12

6β,16α-dimethyl-21-acetoxy-5α-pregnane-3β,17α-diol-20-one

A mixture of 166 g. of 6β,16α-dimethyl-20-bromo-21-acetoxy-5α-pregn-17(20)-ene-3β-ol and 1.5 liters of tetrahydrofuran is added to a mixture of 456 g. of osmium tetroxide, 500 ml. of tetrahydrofuran and 5 ml. of water. The resulting mixture is stirred for 20 days at 30° C., cooled and filtered. The filtrate is washd with aqueous sodium thiosulfate solution and water, dried over sodium sulfate and evaporated. The residue is chromatographed on chromtaographic magnesium silicate eluting with cyclohexane to yield 6β,16α-dimethyl-21-acetoxypregnane-3β,17α-diol-20-one.

EXAMPLE 13

In accordance with the methods hereof and particularly by means of the methods of the process described in Examples 1, 3, 5, 7, 9 and 11, the following 20-halo-21-acyloxypregn-17(20)-ene compounds are prepared from the corresponding 17 - spiro-(gemdihalocyclopropyl)-androstane compounds:

6α-methyl-20-bromo-21-acetoxypregn-17(20)-en-3β,16α-diol,
6β,16α-dimethyl-9α-fluoro-20-chloro-21-propionyloxypregn-17(20)-en-3β,11β-diol,
6α-methyl-20-bromo-21-butyroyloxypregn-17(20)-ene-3β,11β-diol,
20-chloro-21-pentanoyloxypregn-17(20)-ene-3β,16α-diol,
1α,2α-oxido-20-bromo-21-caproyloxypregn-17(20)-en-3β-ol,
20-chloro-21-heptanoyloxypregn-17(20)-ene-3β,11β-diol,
6α-fluoro-20-bromo-21-capryloyloxypregn-17(20)-en-3β-ol,
9α,11β-oxido-20-chloro-21-acetoxypregn-17(20)-en-3β-ol,
16α,16β-difluoro-20-bromo-21-propionyloxypregn-17(20)-en-3β-ol,
6β-fluoro-20-chloro-21-butyroyloxypregn-17(20)-en-3β,5α-diol,
1β,2β-methylene-20-bromo-21-pentanoyloxypregn-17(20)-en-3β-ol,
5,6-oxido-20-chloro-21-caproyloxypregn-17(20)-en-3β-ol, 16α-trifluoromethyl-20-chloro-21-heptanoyloxypregn-17(20)-en-3β-ol,
6α-fluoro-16α-acetoxy-20-chloro-21-capryloyloxypregn-17(20)-en-3β-ol,
20-bromo-21-acetoxypregn-17(20)-en-3β-ol,
9α-chloro-16β-methyl-20-chloro-21-propionyloxy-pregn-17(20)-ene-3β,11β-diol,
20-bromo-21-butyroyloxypregn-17(20)-en-3β-ol, and
9α-fluoro-20-20-chloro-21-pentanoyloxypregn-17(20)-en-3β-ol.

EXAMPLE 14

In accordance with the methods hereof and particularly by means of the methods of the process described in Examples 2, 4, 6, 8, 10 and 12, the above listed (Example 13) compounds can be converted to the corresponding 17α-hydroxy-21-acyloxy-20-keto compounds, to wit, 6α-methyl-21-acetoxypregnane-3β,16α,17α-triol-20-one,
6β,16α-dimethyl-9α-fluoro-21-propionyloxypregnane-3β,11β,17α-triol-20-one,
6α-methyl-21-butyroyloxypregnane-3β,11β,17α-triol-20-one,
21-pentanoyloxypregnane-3β,16α,17α-triol-20-one,
1α,2α-oxido-21-caproyloxypregnane-3β,17α-diol-20-one, and so forth,
3β,21-diacetoxy-6α-methylpregnan-16α,17α-diol-20-one,
3β-acetoxy-6β,16α-dimethyl-9α-fluoro-21-propionyloxypregnan-11β,17α-diol-20-one,
3β-acetoxy-6α-methyl-21-butyroyloxypregnane-11β,17α-diol-20-one,
3β-acetoxy-21-pentanoyloxypregnane-16α,17α-diol-20-one,
1α,2α-oxido-3β-acetoxy-21-caproyloxypregnan-17α-ol-20-one, and so forth.

EXAMPLE 15

The procedure of Part B of Example 2 is repeated utilizing trifluoroperacetic acid, peracetic acid, perbenzoic acid, and perphthalic acid in lieu of m-chloroperbenzoic acid to prepare the 3β,21-diacetoxy-5α-pregnan-17α-ol-20-one product in each instance.

In like manner, the foregoing peracids can be employed in the corresponding preparation of those compounds listed in Example 14, that is, 6α-methyl-21-acetoxypregnane-3β,16α,17α-triol-20-one, 6β,16α-dimethyl-9α-fluoro-21-propionyloxypregnane-3β,11β,17α-triol-20-one and so forth.

EXAMPLE 16

A solution of 6 g. of 21-acetoxy-5α-pregnane-3β,17α-diol-20-one in 120 ml. of pyridine is added to a mixture of 6 g. of chromic trioxide in 20 ml. of pyridine. The reaction mixture is allowed to stand at room temperature for 15 hours, diluted with ethyl acetate and filtered through celite diatomaceous earth. The filtrate is washed well with water, dried and evaporated to dryness to yield 21-acetoxy-5α-pregnan-17α-ol-3,20-dione which may be further purified by recrystallization from acetone:hexane. Two equivalents of bromine in 15 ml. of glacial acetic acid are added dropwise to a solution of 1 g. of 21-acetoxy-5α-pregnan-17α-ol-3,20-dione, in 25 ml. of acetic acid containing a few drops of 4 N hydrogen bromide in acetic acid. After being allowed to stand for five hours at room temperature, the mixture is poured into ice water and the solid which forms is collected by filtration, washed well with water and dried. This material is then refluxed for 14 hours with 2 g. of sodium iodide in 40 ml. of 2-butanone, allowed to stand at room temperature for 12 hours, diluted with water, and extracted with ether. These extracts are washed with sodium thiosulfate solution and water and evaporated under reduced pressure. The residue is dissolved in 35 ml. of acetone, and treated under carbon dioxide with aqueous solution of 11 g. of chromic chloride. After allowing the mixture to stand at room temperature for 20 minutes, water is added and the mixture is extracted with ether. These extracts are washed with water to neutrality, dried and evaporated. The residue is mixed with 0.8 g. of potassium carbonate in 35 ml. of methanol and 7 ml. of water and refluxed for 30 minutes. The mixture is extracted with chloroform and these extracts are chromatographed on alumina with 7:3 chloroform:benzene to yield 21-acetoxy-pregn-4-en-17α-ol-3,20-dione.

In the manner corresponding with that above in this example, the other corresponding 3-hydroxy-5α-compounds prepared as described above can be converted to the corresponding 3-keto-Δ⁴ compounds. In those instances in which the compound also contains a hydroxyl group which competes with the oxidation step (paragraph 1 above) it is preferable to first protect these groupings such as by forming the 16,17-isopropylidenedioxy grouping in accordance with standard procedures or by standard etherification or esterification at C–16α and C–21. These procedures can be illustrated as follows:

To 120 ml. of acetone containing 1 g. of 21-acetoxy-5α-pregnane-3β,16α,17α-triol-20-one are added 30 drops of 70% perchloric acid. The mixture is allowed to stand one hour at room temperature, 30 drops of pyridine are added and the solution is evaporated to dryness under reduced pressure. Thirty milliliters of water are added to the residue and this mixture is extracted several times with ethyl acetate. The combined extracts are washed to neutrality with water, dried over sodium sulfate and evaporated to dryness. The residue upon trituration with methanol yields 16α,17α - isopropylidenedioxy - 21-acetoxy-5α-pregnan-3β-ol-20-one.

The latter prepared compound when treated in accordance with paragraphs 1 and 2 of this example is converted to 16α,17β - isopropylidenedioxy - 21-acetoxypregn-4-ene-3,20-dione.

EXAMPLE 17

One gram of 21-acetoxypregn-4-ene-11β,17α-diol-3,20-dione is dissolved with slow heating in 12.5 ml. of dimethylformamide. To the cooled mixture is then added 0.42 g. of methanesulfonyl chloride and 0.5 ml. of pyridine. After heating the reaction mixture at 80° C. for 30 minutes it is cooled, diluted with water and extracted with ethyl acetate. The extracts are washed with water, dried over sodium sulfate and evaporated to yield 21-acetoxypregna - 4,9(11) - dien-17α-ol-3,20-dione which may be further purified by recrystallization from acetone:hexane.

To a solution of 1.6 g. of 21-acetoxypregna-4,9(11)-dien-17α-ol-3,20-dione in 4 ml. of chloroform is added over a 5 minute period with continuous stirring, a solution of 0.3 g. of chlorine in 10 ml. of carbon tetrachloride. After being allowed to stand at room temperature for 20 minutes, the mixture is treated with 10 ml. of 5% aqueous sodium carbonate solution and extracted with chloroform. The chloroform extracts are washed with water to neutrality, dried over sodium sulfate and evaporated to dryness to yield 9α,11β-dichloro-21-acetoxy-pregn-4-en-17α-ol-3,20-dione which may be recrystallized from acetone:hexane.

EXAMPLE 18

To a suspension of 1 g. of 16α-methyl-21-acetoxypregn-4-ene-11β,17α-diol-3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 3-ethoxy-16α - methyl-21-acetoxypregna-3,5-diene-11β,17α-diol-20-one which is recrystallized from acetone:hexane.

A mixture of 5 g. of 3-ethoxy-16α-methyl-21-acetoxypregna-3,5-diene-11β,17α-diol-20-one, 2 g. of anhydrous sodium acetate and 100 ml. of acetone is treated with 32 ml. of water. The solution is cooled to 5° C. and 1.1 molar equivalents of N-chlorosuccinimide and 2 ml. of glacial acetic acid are added. The mixture is stirred for 30 minutes at the same temperature and then diluted with water. After being allowed to stand at 0° C. for 15 hours, the solid is collected by filtration, washed with water and dried under vacuum to yield 6β-chloro-16α-methyl-21-acetoxypregn-4-ene-11β,17α-diol-3,20-dione which is recrystallized from acetone. The corresponding 6α-chloro compound is obtained by dissolving this compound in glacial acetic acid and introducing a slow stream of anhydrous hydrogen chloride over a period of four hours and a temperature of 15° C. The solid which forms upon pouring this mixture into water is collected by filtration, washed with water and dried to yield 6α-chloro-16α-methyl - 21 - acetoxypregn-4-ene-11β,17α-diol-3,20-dione which is recrystallized from acetone:hexane.

EXAMPLE 19

A mixture of 0.5 g. of 9α,11β-dichloro-21-acetoxypregn-4-en-17α-ol-3,20-dione, 10 ml. of dioxane and 0.35 g. of 2,3 - dichloro - 5,6 - dicyano - 1,4-benzoquinone is refluxed for 10 hours. The mixture is then cooled, filtered and evaporated to dryness. The residue is dissolved in acetone and this solution is then filtered through 10 g. of alumina and concentrated to yield 9α,11β-dichloro-21-acetoxypregna-1,4-dien-17α-ol-3,20-dione which is further purified by recrystallization frome acetone:hexane.

A mixture of 1 g. of 9α,11β-dichloro-21-acetoxypregn-4-en-17α-ol-3,20-dione, 2 g. of chloranil, 15 ml. of ethyl acetate and 5 ml. of acetic acid is refluxed under nitrogen for 96 hours. The mixture is then cooled and washed with cold 10% aqueous sodium hydroxide until the washings were colorless. The organic solution is dried over sodium sulfate and the ethyl acetate removed by evaporation. Upon chromatography of the residue on neutral alumina there is obtained 9α,11β-dichloro-21-acetoxypregna-4,6-dien-17α-ol-3,20-dione which may be further purified by recrystallization from acetone:hexane.

What is claimed is:
1. The process of preparing a compound of the formula

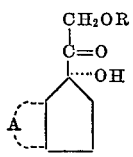

wherein A is the remainder of the steroid molecule comprising the A, B, and C rings and R is carboxylic acyl of from one to eight carbon atoms, inclusive which comprises the steps of:
 (a) treating a 17α - spiro-(gem-dihalocyclopropyl)-androstane with a soluble silver salt in a carboxylic acid to yield the corresponding 20-halo-21-acyloxypregn-17(20)-ene and
 (b) oxidizing the resulting 20-halo-21-acyloxypregn-17(20)-ene with osmium tetroxide, either alone or in combination with hydrogen peroxide; a percarboxylic acid; phenyliodoso acetate; or morpholine.
2. The process according to claim 1 wherein step (a) is conducted in an inert gas atmosphere at at temperature of from 15° C. to the boiling point of the reaction mixture and
step (b) is conducted with osmium tetroxide or a percarboxylic acid at a temperature between 0° C. and the boiling point of the reaction mixture.
3. The process according to claim 1 wherein
step (a) is conducted in an inert gas atmosphere at a temperture of from 15° C. to the boiling point of the reaction mixture with at least two molar equivalents of a soluble silver salt in a carboxylic acid solvent, alone or combination with an inert organic ether solvent and
step (b) is conducted at about room temperature in an inert gas atmosphere with osmium tetroxide in an inert organic ether solvent or with a percarboxylic acid in an inert hydrocarbon or halogenated hydrocarbon solvent.
4. The process according to claim 1 wherein
step (a) is conducted with from two to about six molar equivalents of a soluble silver salt selected from the group consisting of silver acetate, silver chlorate, silver perchlorate, silver nitrate, and silver fluoride, in acetic acid, alone or in combination with dioxane or tetrahydrofuran, at the boiling point of the reaction mixture and under a nitrogen gas atmosphere and
step (b) is conducted with from one to six molar equivalents of osmium tetroxide in diethyl ether at about room temperature and under a nitrogen gas atmosphere.
5. The process according to claim 1 wherein step (a) is conducted with silver acetate in acetic acid.
6. The process according to claim 1 wherein step (a) is conducted with silver fluoride in acetic acid.
7. The process according to claim 1 wherein step (a) is conducted with silver nitrate in acetic acid.
8. The process which comprises the step of treating a 17-spiro-(gem-dihalocyclopropyl)-androstane with a soluble silver salt in a carboxylic acid to yield the corresponding 20-halo-21-acyloxypregn-17(20)-ene.
9. The process according to claim 8 wherein the carboxylic acid is acetic acid.
10. The process according to claim 9 wherein the soluble silver salt is silver acetate.
11. The process according to claim 9 wherein the soluble silver salt is silver fluoride.
12. The process according to claim 9 wherein the soluble silver salt is silver fluoride.

References Cited
UNITED STATES PATENTS
3,435,029  3/1969  Jackson et al. ____ 260—239.55

LEWIS GOTTS, Primary Examiner
E. G. LOVE, Assistant Examiner

U.S. Cl. X.R.
195—51; 260—239.55 R, 239.5, 397.47, 397.5